Dec. 14, 1971 T. WILDI 3,626,767
MECHANICAL SYSTEM FOR COUPLING TWO ROTATING MACHINES
Filed July 16, 1970 2 Sheets-Sheet 2

INVENTOR
Theodore WILDI
BY
Raymond A. Robic
ATTORNEY

United States Patent Office 3,626,767
Patented Dec. 14, 1971

3,626,767
MECHANICAL SYSTEM FOR COUPLING
TWO ROTATING MACHINES
Theodore Wildi, Quebec City, Quebec, Canada, assignor to Lab-Volt (Quebec) Limited, Quebec City, Quebec, Canada
Filed July 16, 1970, Ser. No. 55,438
Int. Cl. F16m 3/00
U.S. Cl. 74—16                                          11 Claims

ABSTRACT OF THE DISCLOSURE

A system for mechanically coupling two or more rotating machines comprising at least two carriages each supporting one rotating machine having extensions at both ends of its regular shaft and hubs mounted on such shaft extensions. A soft coupling is adapted to mate with the hubs of two machines and each carriage is provided with notched links rotatably mounted on each side and at one end thereof, and with studs mounted one on each side and at the other end thereof. The links and studs are designed and located so that the notches in the links of one carriage engage the studs in the other carriage so as to couple the carriages end to end in such a way that the soft coupling between the two hubs of each machine permits to mechanically couple the two rotating machines.

Figure 1:
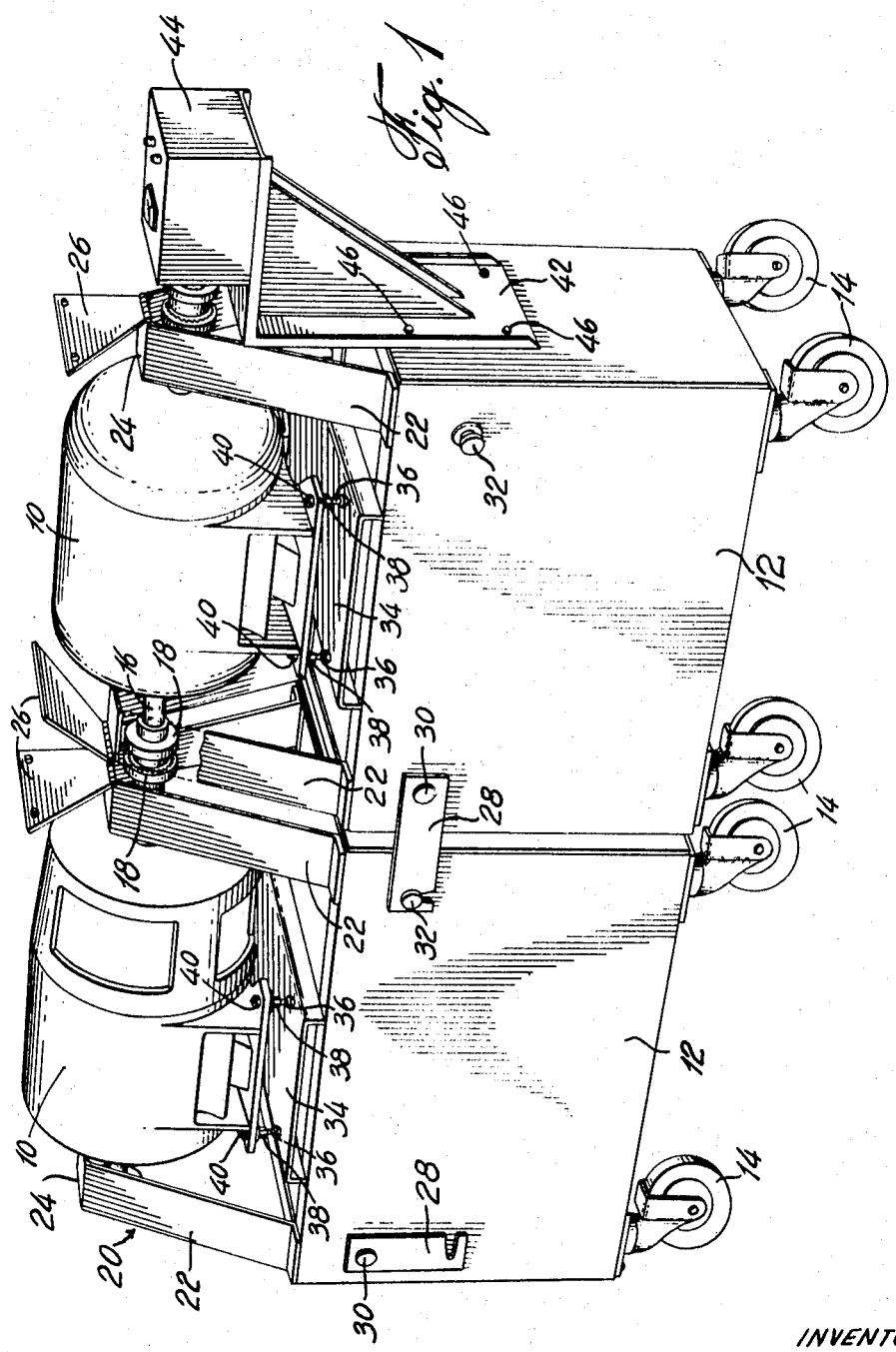

This invention relates to a mechanical system for coupling a rotating source of power to a load.

The need arises in electrical and mechanical power laboratories of educational institutions to mechanically couple together a rotating source of power such as a motor to a load. The load is typically a generator, a pony brake or other devices capable of receiving and absorbing mechanical power.

The trend towards mobility has also encouraged the mounting of such motors and loading devices on movable platforms or wheels.

It is the object of the invention to provide a means for coupling mechanically such mobile rotating machines so that:

(1) The coupling is inexpensive, rugged, simple and safe;
(2) The coupling will not release accidentally;
(3) The coupling will be able to accommodate uneven floors;
(4) The coupling will not produce excessive vibrations;
(5) The coupling (and uncoupling) of such machines can be done in a matter of seconds, even for machines of several horsepower.

It is a further object of the invention to provide a means for coupling two machines which will not cause harm to persons in the immediate vicinity in the event the machines are forcibly uncoupled while running.

The above-mentioned multiple features of the invention are met by a system, in accordance with the invention, comprising at least two carriages each supporting one rotating machine having extensions at each end of its regular shaft and hubs mounted on such shaft extensions. A soft coupling is adapted to mate with such hubs between two machines and each carriage is provided with means for coupling the carriages end to end in such a way that the soft coupling between the two hubs of each machine mechanically couples the two rotating machines together.

The means for coupling the two carriages together comprise two notched links rotatably mounted one on each side and at one end of each carriage and adapted to swing in a vertical plane, and two studs mounted one on each side and at the other end of each carriage, such links and studs being so designed and located that the notches in the links of one carriage engage the studs in the other carriage.

In order to couple two machines together, the hubs must be accurately located with respect to the links and the studs or with respect to the ground. For that purpose, means are provided on each carriage for adjusting the height of the machine secured thereon.

The assembly for coupling two machines together may take various forms. In a preferred embodiment of the invention the hubs and coupling are serrated. In another embodiment the hubs have pins symmetrically located thereon and the soft coupling has holes therein into which the pins may protrude to couple the hubs of two machines.

The two links and the two studs of each carriage may be located at the same end of the carriage. However, the links and the studs may also be positioned diagonally on each carriage so as to facilitate coupling of two carriages together. Indeed, with the last-mentioned arrangement, two machines may be brought together and coupled as they come without having to check if the links of one machine are facing corresponding studs of the other machine.

The studs and links of each carriage may also be made of metallic material to establish a good electrical contact between the carriages of coupled machines for safety reasons.

Each carriage may also include means for mounting accessories such as binding post, wiring diagrams, tachometers, and electrical wirings associated with each machine.

Figure 2:
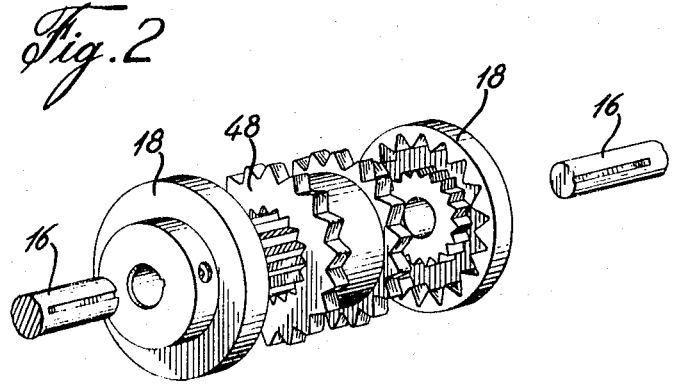
Figure 3:
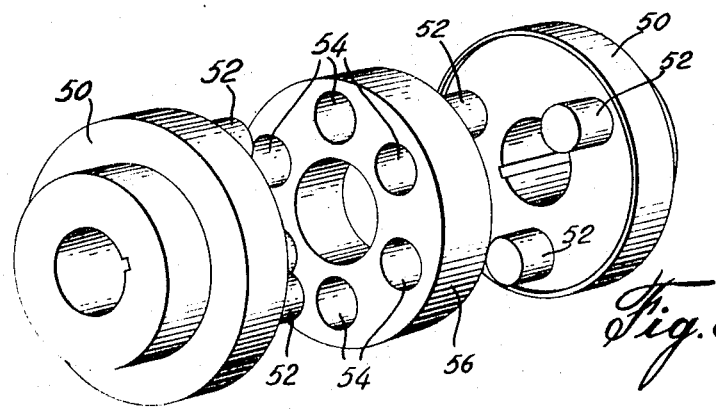
Figure 4:
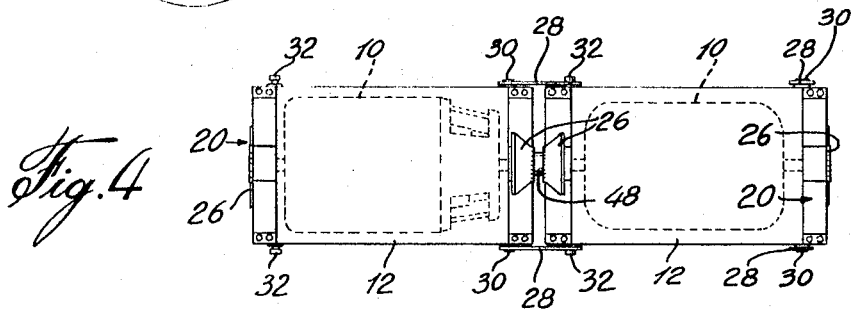
Figure 5:
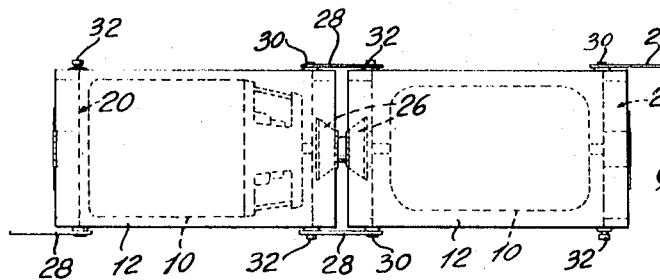

The invention will now be disclosed with reference to the description of a preferred embodiment thereof and to the accompanying drawings in which:

FIG. 1 illustrates a perspective view of two rotating machines coupled together;
FIG. 2 illustrates a first coupling assembly for connecting together two machines;
FIG. 3 illustrates a second coupling assembly for connecting together two machines;
FIG. 4 illustrates a top view of two coupled machines for the purpose of indicating the location of the links and studs on each carriage; and
FIG. 5 illustrates an alternative arrangement of the links and studs on each carriage.

FIG. 1 illustrates the two rotating machines 10 each one being mounted on a carriage 12 which is free to roll on casters 14. Each machine has a double shaft extension 16 at the end of which are secured metallic hubs 18 which are protected by guards 20. Each guard is made of two lateral members 22 connected by a cross member 24 and of a flap 26 hinged on the cross member 24 and adapted to cover the end of the hubs when hanging down freely from the cross member 24.

A notched flat link 28 is firmly retained by but free to rotate around a pivot 30 which in turn is fixed to the side of one end of each carriage. An identical link, not shown in FIG. 1, is located on the opposite side of the carriage.

A stud 32 is located at the other end of the carriage. Of course, a similar stud is also located on the other side of the machine but does not appear in FIG. 1. When two carriages are to be coupled together, the studs 32 on one carriage engage with the notch of the links 28 on the other carriage as shown in FIG. 1. The hinged flaps 26 of the guard 20 are raised so that the shafts of the two machines may be coupled together, by the coupling shown in more detail in FIG. 2.

The links 28 may be made of metallic material to establish good electrical contact between the carriages of the coupled machines for grounding the two machines for safety purposes.

Means are provided to establish a uniform hub position with respect to links 28 and studs 32 and also with respect to the floor. To this effect, each rotating machine is secured to a platform 34 which is accurately positioned in the center of the carriage 12 so that each shaft extension 16 extends approximately up to the longitudinal edge of the carriage. The position of the hub with respect to links 28 and studs 32 or with respect to the floor is adjusted by bolts 36 having a nut 38 for adjusting the height of the machine and a nut 40 for securing the machine in position.

Each carriage may also include means for mounting accessories such as a bracket 42 holding a tachometer 44 coupled to one of the shaft extensions of the rotating machine. Such means may take the form of bolts 46 permanently secured to one end of each carriage and adapted to protrude through corresponding holes in the bracket 42. Other accessories such as binding posts, wiring diagrams and electrical wirings may also be mounted on each carriage.

In FIG. 2, there is shown in an enlarged exploded view, the shaft extensions 16 of two machines fitted with the metallic hubs 18. The inside portion of each hub 18 is serrated and adapted to be engaged by a matching flexible rubber coupling 48 which fits into and between two machines whose hubs are to be coupled. The above hub assembly and rubber coupling are well known in the art.

In FIG. 3 there is shown an alternative coupling assembly including two hubs 50 each one being provided with three symmetrically located pins 52 adapted to protrude through corresponding holes 54 in a flexible rubber coupling 56. Of course, other forms of coupling assembly could also be envisaged.

FIG. 4 illustrates a plan view of two rotating machines coupled together for the purpose of illustrating the location of the links and studs on both sides of the carriages. In FIG. 4, both links 28 of each carriage are located at the same end while the studs are located at the opposite end.

FIG. 5 shows another embodiment of the invention in which the links and the studs are located at diagonally opposite corners of the carriages. This arrangement permits either shaft extension of one machine to be connected to either shaft extension of another machine. Thus, in FIG. 5, both shaft extensions of the right hand machine may be connected to the right hand extension or hub of the left hand machine and vice versa. Such an arrangement of links 28 and studs 32 is advantageous because it permits to bring two machines together and to couple them as they come without having to check if the links of one carriage are facing corresponding studs of the other carriage as it is the case for the arrangement of FIG. 4.

In order to couple two machines together, hinged flaps 26 are raised and hubs 18 of the shaft extensions to be joined are made to engage the common rubber coupling 48. To do so, the mobile carriages are gently pushed together and one of the shaft extensions is slowly rotated by hand to engage the male and female serrations on rubber coupling 48 and hubs 18 respectively. The links 28 of one carriage are then swung around pivot 30 so that the notches thereof engage the studs 32 in the other carriage. The two machines as well as the carriages are now coupled together, and they may be moved about by pushing or pulling on either one or both the machines or carriages.

Other machines may be similarly coupled to the two which are already joined to obtain arrangements of three, four and more machines coupled together.

The machines can be uncoupled in the inverse sequence which was employed to couple them. The links 28 are lifted manually to disengage the studs 32 and then the carriages are simply drawn apart to disengage the hubs and serrated rubber couplings. Of course, the procedure is the same if other types of coupling assemblies are used such as, for example, the one illustrated in FIG. 3.

If the machines are uncoupled while they are running, the rubber coupling only bounces around, and can cause no harm to bystanders.

Tests have shown that if two or more machines are on a very uneven floor, the method of coupling described above has the necessary flexibility to accommodate it. Thus, the links are free enough, even when engaged in the studs of the other carriage, to permit considerable vertical and lateral displacement of one carriage with respect to the other.

I claim:

1. A system for mechanically coupling two or more rotating machines, said system comprising:
   (a) at least two carriages each supporting one rotating machine having extensions at each end of its regular shaft;
   (b) hubs mounted on the shaft extensions of each machine;
   (c) a soft coupling adapted to mate with said hubs between two machines;
   (d) two notched links rotatably mounted one on each side and at one end of each carriage, and adapted to swing in a vertical plane; and
   (e) two studs mounted one on each side and at the other end of each carriage, said links and studs being so designed and located that the notches in the links of one carriage engage the studs in the other carriage, whereby said carriages may be coupled end to end in such a way that the soft coupling between the two hubs of each machine mechanically couples the shafts of the two rotating machines.

2. A system as defined in claim 1, in which means are provided to establish a uniform hub position with respect to said links and studs.

3. A system as defined in claim 1, in which the hubs and couplings are serrated.

4. A system as defined in claim 1, in which the studs and links are metallic to establish good electrical contact between the carriages of coupled machines.

5. A system as defined in claim 1, in which both links and both studs are located at the same end of each carriage.

6. A system as defined in claim 1, in which the links and the studs are diagonally positioned on each carriage.

7. A system as defined in claim 1, in which the carriages are supported on mobile casters.

8. A system as defined in claim 1, in which each carriage includes means for mounting accessories such as binding posts, wiring diagrams, tachometers, and electrical wirings associated with each machine.

9. A system as defined in claim 1, in which each carriage includes means at one end thereof for mounting a bracket for supporting accessories capable of being connected to the machines such as tachometers or other devices.

10. A system as defined in claim 1, further comprising guards mounted on each carriage for protecting the shaft extensions and hubs connected thereto.

11. A system as defined in claim 10, wherein said guard comprises two lateral members joined by a cross member and a flap hinged on said cross member and adapted to cover the end of the hubs when hanging down freely from said cross member.

References Cited
UNITED STATES PATENTS

| | | | |
|---|---|---|---|
| 2,565,473 | 8/1951 | Cline | 74—16 |
| 2,756,573 | 7/1956 | Colby et al. | 64—31 |
| 3,296,827 | 1/1967 | Landon Jr., et al. | 64—13 X |
| 3,523,491 | 8/1970 | Howell | 64—13 X |

KENNETH W. SPRAGUE, Primary Examiner

U.S. Cl. X.R.

64—13